United States Patent
Frey (10) Patent No.: US 9,118,561 B2
(45) Date of Patent: Aug. 25, 2015

(54) NETWORK SWITCH AND METHOD FOR AUTOMATICALLY ESTABLISHING CONNECTION TO A WIDE AREA NETWORK

(71) Applicant: CISCO TECHNOLOGY, INC., San Jose, CA (US)

(72) Inventor: Clifford A. Frey, San Francisco, CA (US)

(73) Assignee: Cisco Technology, Inc., San Jose, CA (US)

(*) Notice: Subject to any disclaimer, the term of this patent is extended or adjusted under 35 U.S.C. 154(b) by 357 days.

(21) Appl. No.: 13/691,645

(22) Filed: Nov. 30, 2012

(65) Prior Publication Data

US 2014/0153441 A1 Jun. 5, 2014

(51) Int. Cl.
*H04L 12/24* (2006.01)
*H04L 12/26* (2006.01)
*H04L 12/939* (2013.01)
*H04L 12/931* (2013.01)

(52) U.S. Cl.
CPC ............ *H04L 41/0886* (2013.01); *H04L 43/50* (2013.01); *H04L 49/354* (2013.01); *H04L 49/555* (2013.01)

(58) Field of Classification Search
None
See application file for complete search history.

(56) References Cited

U.S. PATENT DOCUMENTS

2008/0147828 A1* 6/2008 Enstone et al. ............... 709/220
2008/0285483 A1 11/2008 Gil et al.
2008/0285575 A1 11/2008 Biswas et al.
2008/0288614 A1 11/2008 Gil et al.
2008/0294759 A1 11/2008 Biswas et al.
2008/0304427 A1 12/2008 Biswas et al.
2010/0121946 A1* 5/2010 Claes et al. ................... 709/223
2012/0102166 A1* 4/2012 Wackerly ...................... 709/222

OTHER PUBLICATIONS

U.S. Appl. No. 13/350,736, filed Jan. 13, 2012, 57 pages.
"Cisco Network Assistant Quick Tips," 2005, 22 pages., Cisco Systems, Inc., downloaded from http://www.cisco.com/en/US/prod/collateral/netmgtsw/ps6504/ps5931/prod_white_paper0900aecd802d1b95.pdf on Nov. 28, 2012.
"Clustering Switches," Jun. 2003, 24 pages, Catalyst 2940 Switch Software Configuration Guide, Cisco IOS Release 12.1(13)AY, Chapter 5, Cisco Systems, Inc., downloaded from http://www.cisco.com/en/US/docs/switches/lan/ catalyst2940/software/release/12.1_13_ay/configuration/guide/swclus.pdf on Nov. 28, 2012.

(Continued)

*Primary Examiner* — Hanh N Nguyen
*Assistant Examiner* — Joshua A Kading
(74) *Attorney, Agent, or Firm* — Novak Druce Connolly Bove + Quigg LLP (57) ABSTRACT

A network switch is configured to automatically establish a connection to a WAN by determining which of a plurality of ports of the network switch is a current uplink port leading to the WAN. The switch attempts to establish connectivity to the WAN using a first set of port configurations as the current set of port configurations. Upon determining that the first set of port configurations does not allow the network switch to determine an uplink port, the network switch changes to a mode having a first security measure and also having a relaxed set of current port configurations. The network switch again attempts to establish connectivity to the WAN, and upon further failures to determine an uplink port leading to the WAN, the network switch may be configured to switch to other modes utilizing further relaxed port configurations and the same or additional security measures.

21 Claims, 6 Drawing Sheets

(56) References Cited

OTHER PUBLICATIONS

"Datasheet, Cloud Management," 6 pages, Meraki, Inc., downloaded from http://www.meraki.com/lib/pdf/meraki_datasheet_cloud_management.pdf on Nov. 28, 2012.

"Datasheet, MS Series," 9 pages, Meraki, Inc., downloaded from http://www.meraki.com/lib/pdf/meraki_datasheet_ms.pdf on Nov. 28, 2012.

"Datasheet, MX Series," 8 pages, Meraki, Inc., downloaded from http://www.meraki.com/lib/pdf/meraki_datasheet_mx.pdf on Nov. 28, 2012.

"Meraki Cloud Controller Product Manual," Dec. 2011, 124 pages, Meraki, Inc.

"Meraki White Paper: Meraki Hosted Architecture," Feb. 2011, 13 pages, Meraki, Inc.

"Meraki Press Releases," Jan. 18, 2012, 3 pages, Meraki, Inc., downloaded from http://www.meraki.com/company/press-releases?uri=2012/01118/cloud-managed-switches/ on Nov. 28, 2012.

* cited by examiner

NETWORK SWITCH AND METHOD FOR AUTOMATICALLY ESTABLISHING CONNECTION TO A WIDE AREA NETWORK

FIELD

This disclosure relates generally to networking and in particular but not exclusively, relates to a network switch automatically establishing a connection to a wide area network.

BACKGROUND

A physical local area network (LAN) may include numerous network access devices (e.g., routers, switches, wireless access points, etc.) that communicate with one another (either directly or indirectly) to provide computing device(s) (e.g., laptops, smartphones, etc.) access to a wide area network (WAN). Thus, a network access device (NAD) is a piece of networking equipment, including hardware and software, which communicatively interconnects other equipment on the LAN (e.g., other network elements, computing devices). The WAN can include, for example, the Internet, where communication with the WAN is through an interface such as T1, T3, cable, Digital Subscriber Line (DSL), wireless (e.g., mobile cell tower), or the like.

The one or more of the network access devices within the LAN that are the last of the network access devices before reaching the WAN (network access devices that are directly coupled to the WAN or directly coupled to an interface device—e.g., a DSL modem) act as a gateway to the WAN (act as a gateway node for the LAN) for other network access devices and network computing devices in the LAN; any network access devices that rely on (communicates with) one or more other network access devices to reach the WAN act as intermediate nodes of the LAN.

When deployed, a conventional network access device must include an Internet Protocol (IP) configuration that allows that network access device to establish a connection to a WAN (communicate with and across the WAN). Determining an IP configuration for a network access device acting as an intermediate node of the LAN may be more challenging because between such an intermediate node and the WAN are one or more other network access devices of the LAN that each have configurations that may impact connectivity to the WAN.

LANs are useful because they are highly customizable to fit the needs of a particular entity. For example, the physical LAN, itself, may be configured to include multiple virtual local area networks (VLANs). A VLAN is a group of network access devices which communicate as if they were attached to the same broadcast domain, regardless of their physical location. A VLAN may have the same attributes as a physical LAN, but allow network computing devices to be grouped together even if they are not directly connected to the same network access device.

Configuring network access devices typically requires manual configuration by an on-site network administrator, engineer, or technician. Also, changes to the access network (e.g., adding/removing network access devices, moving of equipment, regrouping of VLANs, etc.) may require configuration changes to one or more network access devices, which again must be performed on-site. Configuration of network access devices requires a trained network engineer and includes a number of error-prone steps. Incorrect configurations may cause the network access device to lose its connection to the WAN, which can lead to a network outage. Network outages can be difficult and expensive to troubleshoot and result in lost productivity.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DESCRIPTION OF EMBODIMENTS

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

A network switch is described that is able to automatically establish a connection to a WAN, including determining which of its plurality of ports is an uplink port, without the need for local on-site configuration of the network switch. In some embodiments of the invention, the network switch attempts to automatically establish a connection to the WAN by testing Internet Protocol (IP) configuration(s) using as the current set of port configurations a first set of port configurations (e.g., a most recent administratively configured set or port configurations), and if failing to find a valid IP configuration, switching to a mode utilizing as the current set of port configurations a different (a second) set of port configurations along with security measure(s), and then testing IP configuration(s) using this different set of port configurations. Upon finding a set of one or more valid IP configurations, the network switch sets one of this set of valid IP configurations as the current IP configuration of the network switch (the one used to communicate live traffic with the WAN).

In certain embodiments, the network switch is a network administered device, to be administered via a management server over a WAN (e.g., the Internet). It is assumed that an administrator associated with the network switch has registered the network switch with a management server (see discussion of management server below with reference to FIGS. 7 and 8). The network switch includes device information to assist in establishing communication with the management server (such as a serial number that is unique to the network switch, an address of the management server (MS) address (i.e., IP address), and a private key to allow the management server to authenticate the network switch). A network switch according to the present disclosure may automatically establish (or re-establish) a connection to the WAN so that a remote network administrator (e.g., using a remote management server over the WAN) may perform any necessary setup or configuration tasks. Thus, embodiments of the present invention may allow for easier installation, configuration, and maintenance of a network switch in a LAN.

Each of a network switch's ports has a current port configuration that identifies a set of zero or more VLAN IDs, and network traffic must meet the current port configuration of the ports on which that network traffic is received and transmitted to avoid that network traffic being blocked at those ports; that is, network traffic meeting the current port configuration of the receiving port and transmitting port will be communicated through the switch). In one embodiment, when a switch receives a packet at a given port, it decides what VLAN to put the packet on—the logic is that if a packet received at a given port is "untagged" (it does not contain a VLAN ID), that packet is put on the native VLAN (the native VLAN ID is added to the packet) if there is a native VLAN identified in the receiving port's current port configuration; however, if the packet is "untagged" and there is no native VLAN in the receiving port's current port configuration, that packet is dropped. In contrast, if a packet received at a given port is "tagged" (it does not contain a VLAN ID), then if the port is configured to accept traffic from that VLAN (the VLAN ID in the packet is in the receiving port's port configuration—that is, the VLAN ID in the packet matches a VLAN ID identified in the receiving port's port configuration as either a native VLAN ID or one of a set of zero or more permissible VLAN IDs), the packet is accepted; else it is dropped. In such an embodiment, when a switch transmits a packet out a given port it will have a VLAN ID (as described above, it either had one upon receipt, was assigned the native VLAN ID of the receiving port, or dropped)—if that VLAN ID is in the transmitting port's port configuration (the VLAN ID in the packet matches a VLAN ID identified in the transmitting port's port configuration as either a native VLAN ID or one of a set of zero or more permissible VLAN IDs), the packet is transmitted; else it is dropped.

According to one embodiment of the invention, an IP configuration is the combination of a VLAN identifier (ID), an IP address of the NAD, a subnet mask, an IP address of a default gateway, an IP address of a primary Domain Name System (DNS) server, and optionally an IP address of a secondary DNS server. While embodiments of the invention are described herein with reference to IPv4, alternative embodiments of the invention use IPv6 instead of or in addition to IPv4.

Different embodiments may have one IP configuration or a plurality of IP configuration to select from when testing IP configurations with a give set of port configurations. Embodiments that support selection from a plurality of IP configurations may make the selection in a variety of ways (e.g., using different priority schemes, select multiple in parallel, etc.) and may include different source of IP configurations. By way of example, certain embodiments support the following sources of IP configurations: 1) a statically configured IP configuration includes an IP configuration that is pre-programmed into NAD during manufacture and/or programmed later (e.g., by the manufacturer after sale and prior to shipment, and/or by a system administrator of the purchaser prior to deployment, prior to redeployment, while deployed, etc.); a Previous valid IP configuration is limited to an IP configuration, if any, that was the most recently used by the network switch to communicate over the WAN (previously set as the current IP configuration, be it a statically configured IP configuration or a dynamic IP configuration), and thus was previously determined by the NAD to be valid (referred to as the most recent working IP configuration); 3) dynamically determined IP configurations obtained based on DHCP leases. With regard to dynamically determined IP configurations, in one embodiment attempting to obtain DHCP leases includes transmitting DHCP requests using different VLAN IDs selected according to a VLAN priority scheme; any DHCP leases that are indeed obtained as a result of the DHCP requests and DHCP replies thereto are each used to create a dynamically determined IP configurations to test. As will be apparent from the description below, the NAD attempting to obtain DHCP leases tests whether VLAN IDs are valid so that the NAD can determine which VLAN IDs to include in the IP configurations to test. One possible VLAN priority scheme for selecting which VLAN IDS to tests includes four VLAN ID types listed from most to least favored: a static VLAN ID type (included in the statically configured IP configuration), then a previous VLAN ID type (included in the previous valid IP configuration and referred to as the most recent working VLAN ID, be it a static VLAN ID, a native VLAN ID, or a commonly used VLAN ID), then a native VLAN ID type (any native VLAN IDs listed in the current set of port configurations—access and hybrid type port configurations), and then a commonly used VLAN ID type (any permissible VLAN IDs listed in the current set of port configurations—trunk or hybrid type port configurations).

While the testing of IP configurations may be performed a variety of ways, certain embodiments of the invention transmit out request message and watch for appropriate responses. While in one embodiment the requests to test IP configurations are address resolution protocol (ARP) requests and Domain Name System (DNS) requests, alternative embodiments use more, less, or different types of requests. Specifically, in one embodiment, three types of such messages are used to test an IP configuration's IP addresses (IP address of the NAD, the IP address of a default gateway, the IP address of a primary Domain Name System (DNS) server, and the IP address of any secondary DNS server) and VLAN ID.

A first type of request to test the IP configurations 136 includes testing whether an IP address to be utilized by the NAD, per that IP configuration being tested, is available to be used. The address resolution protocol (ARP) requests may be sent for the IP address of the NAD included in the IP configuration that is being tested. If the NAD does not receive an ARP reply to this ARP request then the corresponding IP configuration is determined to be potentially valid. However, if NAD does, indeed, receive an ARP reply in response to the ARP request then the IP configuration is marked as invalid and may be discarded from the list of IP configurations to test.

A second type of request to test the IP configurations 136 involves testing whether a gateway address of the IP configuration appears to be valid. Accordingly, ARP requests are sent to the gateway IP address included in the IP configuration being tested to confirm that such a network access device exists. In this case, if the NAD receives an ARP reply to this ARP request, then the corresponding IP configuration is determined to be potentially valid. Similarly, if no ARP reply is returned in response to the ARP request, the IP configuration is determined to be invalid and not further used.

A third type of request used to test the IP configurations 136 involves determining if a Domain Name System (DNS) server indicated by the IP configuration exists and is able to properly determine an IP address of a known device outside the local network (i.e. connected to the WAN). Accordingly, the domain name system (DNS) requests are sent to the DNS server IP address included in the IP configuration being tested to: 1) confirm that such a DNS server exists; and 2) request the IP address of a known host connected to the WAN. NAD then verifies that the IP address returned to NAD in response to the DNS request is the correct IP address. For example, NAD may be pre-programmed with the IP address of a management server (not shown in FIG. 1) that is connected to the WAN for providing remote management for NAD over the WAN, where the request to test IP configurations 136 is a DNS request sent to the management server asking for the IP address of a domain name of that management server (e.g. "server1.managementserver.com").

A router or a wireless access point will typically have a plurality of ports for the LAN and a single uplink port designated for use to establish a connection to the WAN (directly or indirectly), and the messages for testing of IP configurations are sent and received on only this designated uplink port. However, a network switch will typically be deployed as an intermediate node of a LAN; and any one of a switch's ports may be coupled to the WAN through a series of one or more other network access devices of the LAN (the last of which acts as a gateway to the WAN), and thus in one embodiment the requests for testing of IP configurations are sent towards all of these ports; the one(s) of the ports over which a connection to the WAN is actually established is referred to as the current uplink port(s).

Each of the above request types (including the DHCP requests to generate dynamically determined IP configurations, as well as the ARP and DNS requests used to test IP configurations for WAN connectivity), also tests the VLAN ID since an improper VLAN ID in such requests will cause that request to be blocked. Specifically, for each such request, the CPU will place in the packet(s) of that request the VLAN ID being tested (e.g., in the case of the ARP and DNS request, the VLAN ID of the IP configuration being tested). As described above, each of a network switch's ports has a current port configuration that identifies a set of zero or more VLAN IDs, and network traffic must meet the current port configuration of the port on which that traffic is transmitted to avoid the network traffic from being blocked at that port. For example, assume a given request to test a given IP configuration with a specific VLAN ID is sent by the CPU of the network switch to the switching fabric of that network switch for transmission out all of the network switch's ports, that given request will only be communicated through the ports of the network switch whose current port configurations allow for that specific VLAN ID (any of the network switch's ports whose current port configuration does not allow for that specific VLAN ID will be blocked by the switching fabric).

Figure 1:
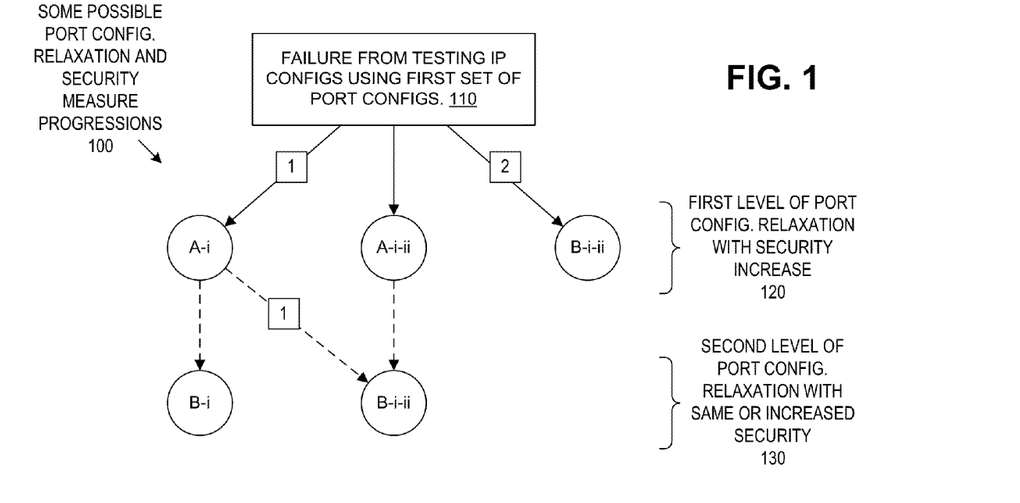
FIG. 1 is a diagram illustrating some possible port configuration relaxation and security measure progression schemes that may be used if a connection to a WAN has not been established, in accordance with exemplary embodiments of the invention.

FIG. 1 is a diagram illustrating some possible port configuration relaxation and security measure progression schemes that may be used if a connection to a WAN has not been established, in accordance with exemplary embodiments of the invention. Prior to the flow in FIG. 1, the network switch tests IP configurations using as the current set of port configurations a first set of port configurations. This first set of port configurations is typically the most recent administratively configured set of port configurations. While in one embodiment the most recent administratively configured set of port configurations is initially a set pre-programmed during manufacture, in other embodiments the manufacturing process does not pre-program a set. Either way, the manufacture may enter a set of port configurations after sale and prior to shipment to the purchaser, in which case this set would be the most recent administratively configured set of port configurations. Of course, a system administrator of the purchaser of the network switch may enter a set of port configurations prior to deployment of the network switch, prior to redeployment of the network switch, while the network switch is deployed, etc.; the latest of which becomes the most recent administratively configured set of port configurations.

In the flow of FIG. 1, the network switch fails to establish connectivity to the WAN 110 using the most recent administratively configured set or port configurations. Such a failure may occur for a variety of reasons, including but not limited to a scenario where the network switch is first installed in a different network environment, where a physical (e.g., disconnecting a cable from a port of the network switch) or configuration (e.g., changing change of the network switch configuration) occurs that causes the loss of connectivity to the WAN, or where a physical or configuration change occurs elsewhere in the network that causes the loss of connectivity to the WAN.

If and when this testing fails 110 and a valid IP configuration has not been found, the network switch switches to a new mode by performing a first level of port configuration relaxation with a corresponding security measure increase 120. After entering this new mode, one or more IP configurations are tested to attempt to find a valid IP configuration and a corresponding current uplink port.

If, after the first level of port configuration relaxation with the security measure increase 120, the IP configuration testing again does not result in a valid IP configuration being discovered, the network switch may enter another mode in which a next level of port configuration relaxation occurs, which is accompanied by an equivalent or increased security measure 130 (as compared to that utilized in the first level of relaxation 120). Similarly, one or more IP configurations are tested in an attempt to find a valid IP configuration and a corresponding current uplink port.

While the process illustrated by FIG. 1 displays two levels of port configuration relaxation after a failure from testing IP configurations using a first set of port configurations 110, embodiments of the invention utilize more or fewer levels (only one) of port configuration relaxation with corresponding security measures. Further, regardless of the number of levels supported, embodiments may repeat the process (return to the first set of port configurations, and so on) until a valid IP configuration is found.

Figure 2:
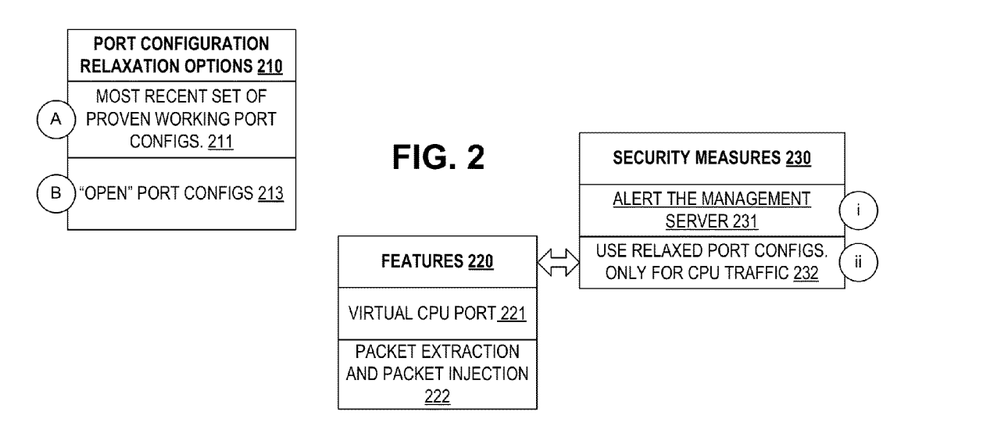
FIG. 2 is a diagram illustrating port configuration relaxation options, security measures, and features that may be used if a connection to a WAN has not been established, in accordance with exemplary embodiments of the invention.

The specific embodiments of possible port configuration relaxation and security measure progressions 100 disclosed within FIG. 1 are best understood with reference to FIG. 2, which is a diagram illustrating port configuration relaxation options 210, security measures 230, and features 220 that may be used if a connection to a WAN has not been established, in accordance with exemplary embodiments of the invention.

Several port configuration relaxation options 210 are presented that provide alternative sets of port configurations that may be used by the network switch after a valid IP configuration has not been found using a first set of port configurations. This list 210 is non-exhaustive, but instead presents two options used in some embodiments of the invention. First, as indicated by circle 'A', is a most recent set of proven working port configurations 211. This most recent proven working set of port configurations 211 are port configurations that were a last set determined to be working—by, for example, allowing connectivity to the WAN.

As indicated by circle 'B', the port configuration relaxation options 210 also includes, in some embodiments, "open" port configurations 213. The use of open port configurations by the network switch enables any traffic arriving at or leaving from the network switch to traverse a port no matter what Virtual Local Area Network (VLAN) Identifier (ID) is included within the traffic.

FIG. 2 also presents several security measures 230 that may be utilized when relaxing port configurations in embodiments of the invention. As indicated by circle 'i', the network switch may alert a management server 231 that a set port configurations other than the first set of port configurations is being used by the network switch. In some embodiments, the network switch proactively generates and transmits a specific message to the management server to indicate this occurrence, and in other embodiments the network switch alerts the management server by setting a warning flag in one or more messages that are used for additional purposes. Additionally, in an embodiment, alerting the management server 231 is done after a valid IP configuration has been found by the network switch and an uplink port has been set as the current uplink port. This enables the network switch to begin processing traffic using this IP configuration and notify the management server of its altered state.

Circle 'ii' indicates another security measure 230 that may be used by the network switch when relaxing port configurations: only utilizing the relaxed current set of port configurations for traffic destined to, or originated by, the CPU of the network switch. This security measure, which may be enabled by features 220 (a virtual CPU port 221 and packet extraction and packet injection mechanism 222, described later herein), is utilized in some embodiments along with the "open" port configurations 213; however, it may also be combined with any of the port configuration relaxation options 210. In some embodiments, while this CPU traffic utilizes the relaxed set of port configurations 213, other more typical non-CPU traffic is still processed and forwarded by the network switch using a different set of port configurations, such as an administratively configured set of port configurations, or most recent set of proven working port configurations (211). In other embodiments, while the CPU traffic utilizes the relaxed set of port configurations, all other non-CPU traffic, such as that from one network device on the LAN or WAN to another network device on the LAN or WAN, is blocked.

With understanding of the port configuration relaxation options 210, features 220, and security measures 230 of FIG. 2, the illustrative and non-exhaustive diagram of possible port configuration relaxation and security measure progressions 100 of FIG. 1 are more readily understood. As described above, after a failure from testing IP configurations using a first set of port configurations 110, the network switch is enabled to attempt to establish connectivity to the WAN by performing one or more levels (120, 130) of port configuration relaxation with the use of accompanying security measures. Each circle of the diagram enumerates both a letter (A, B) indicating a port configuration relaxation option 210 to use as well as a lower-case Roman numeral (i, ii) indicating the security measure 230 to be applied.

In the context of this disclosure, the term "relaxation" does not require that the next port configuration is strictly looser or more permissive than the previous port configuration. While the next port configuration is looser or more permissive than the previous port configuration in some embodiments, in other embodiments the previous port configuration is just different. Accordingly, it is possible that the next port configuration includes different VLAN IDs, but is less permissive (e.g., allows fewer VLAN IDs) than a previous port configuration.

The illustrated first level 120 depicts several possible options available for the network switch. After failing to find a valid IP configuration with the first set of port configurations 110, relaxing the port configurations of the network switch increases the likelihood that WAN connectivity will be achieved (a successful IP configuration and uplink port will be determined) because relaxed (i.e. differing) port configurations provide additional or different opportunities for finding a successful IP configuration. However, the automated use of different port configurations on the network switch creates a possibility of other network devices—either malicious or benign—being able to utilize the network in unintended ways, which can lead to increased network load, the loss of network connectivity, resulting misconfigurations of other devices, unintentional information disclosures, and/or malicious interactions for devices on these networks. Thus, along with the relaxation of port configurations, embodiments of the invention utilize one or more security measures in an effort to reduce or prevent negative results due to the relaxation.

According a first option indicated as square '1' that leads to circle 'A-i', the network switch is configured to relax the current set of port configurations by switching from the first set of port configurations (e.g., the administratively configured set of port configuration) to a most recent set of proven working port configurations 211 (circle 'A') along with the security measure of transmitting an alert to the management server 231 (circle 'i'). After switching the current set of port configurations to this most recent set of proven working port configurations, the network switch tests a set of IP configurations in an attempt to establish connectivity to the WAN (find a working IP configuration and uplink port). If this relaxation leads to success, the working IP configuration is set as the current IP configuration, the working uplink port is set as the current uplink port, and the alert(s) are transmitted to the management server.

If the first level of port configuration relaxation and security increase 120 using the options of circle 'A-i' fails, the port configuration relaxation and security measure progression may continue or terminate. In some embodiments, if the network switch is configured to terminate the progression at this point, the network switch will set the current port configurations back to the first set of port configurations and set the current IP configurations back to the statically configured IP configurations; and start the process again, wait a period of time before beginning the process once again, periodically test for WAN connectivity using first set of port confirmations/statically configured IP configuration (but not try relaxation again), or simply stop the process.

Other embodiments utilize more than a first level of port configuration relaxation 120. In these embodiments, after a failure at the first level 120, the network switch is configured to switch to a new mode and perform a next level of port configuration relaxation with an increased or similar security measure 130. Continuing the example of square '1', where the first level of port configuration relaxation 120 used the options of circle 'A-i', the network switch is configured to switch to a mode utilizing the set of open port configurations 213 with the same security measure (alerting the management server 231) and the additional security measure of only using the relaxed port configurations (i.e. the "open" port configurations) as presented by circle 'B-i-ii'. Alternatively, the network switch could be configured to change to a mode represented by circle 'B-i', which indicates the use of the open port configurations 213 with only the alerting the management server 231.

As illustrated, other options are available for the first level of port configuration relaxation 120, including circles 'A-i-ii' and 'B-i-ii', and many other non-illustrated. In particular, as indicated by square '2', after the failure while using the first set of port configurations 110 the network switch may immediately relax to "open" port configurations 213 coupled with alerting the management server 231 and utilizing the open port configurations only for CPU traffic 232.

It should be apparent to one of ordinary skill in the art that the choice of which progression to utilize may be a design choice made by the manufacturer, or may be programmable and a choice made by the network administrator, depending upon the particularities of the network environment. For example, if security is of the utmost concern, the progression chosen may be very conservative (e.g. only attempting one level of port configuration relaxation 120, albeit with all security measures). If minimizing downtime is of the utmost concern, the chosen progression may be very aggressive (e.g. immediately setting the current port configuration to "open" port configurations along with minimal security measures). For other environments, a middle path might be more appropriate to allow relatively high security and speed.

Figure 3:
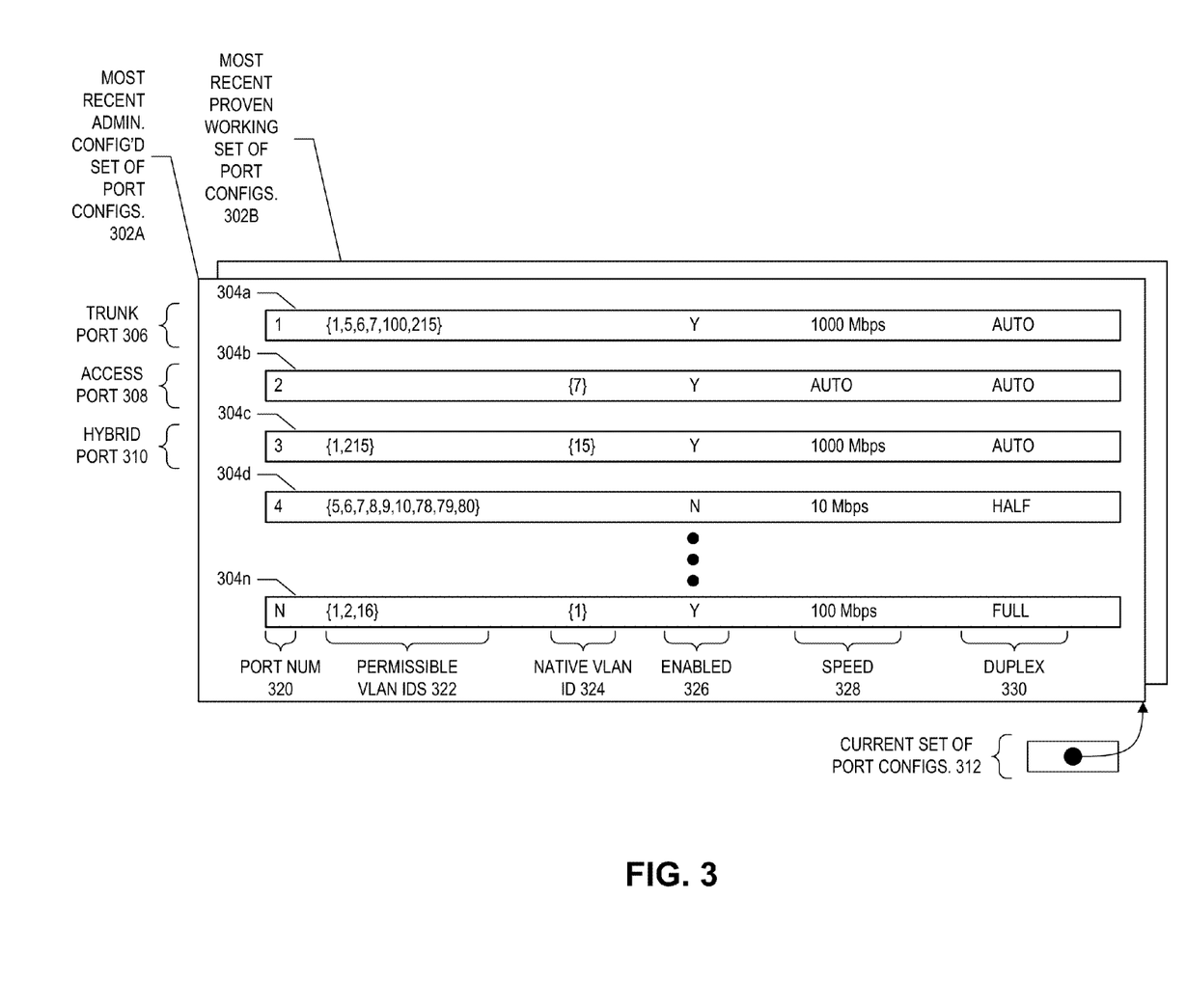
FIG. 3 is a diagram illustrating sets of port configurations, in accordance with exemplary embodiments of the invention.

FIG. 3 is an illustrated example of sets of port configurations 302A-302B according to an embodiment of the invention. The first set of port configurations is the most recent administratively configured set of port configurations 302A. The second set is the most recent set of proven working port configurations 211/302B. As illustrated, a current set of port configurations 312 may be maintained as a pointer to one of these sets of port configurations 302A-302B. In FIG. 3, the current set of port configurations 312 is depicted as identifying the administratively configured set of port configurations 302A.

Each set of port configurations 302A-302B include a set of individual port configurations 304A-304N (one for each port of the network switch). Individual port configurations 304A-304N allow respective ports to be configured as a trunk port 306 that typically leads to another network access device such as a switch or router, configured as an access port 308 that is connected to a computing device/end station device such as a server or workstation, or configured as a hybrid port 310 that can flexibly be connected to either a network access device or end station device.

Each individual port configuration (e.g. 304A) includes one or more of the following: a port number 320 of a respective port, a set of permissible VLAN IDs 322 for that port (commonly for trunk ports and hybrid ports), a native VLAN ID 324 (commonly for access ports and hybrid ports), an 'enabled' flag 326 indicating whether the port is to be utilized, a configured speed 328 indicating a maximum amount of data that is allowed to pass through the port over a period of time, and a configured duplex setting 330 indicating whether the port is to operate at half or full duplex. In the case of configured speed 328 and duplex 330, the port configuration value may be set to 'AUTO', indicating whether the switch should automatically negotiate or determine a proper value on its own. While one embodiment is shown with separate speed 318 and duplex 330 columns and treats these separately, alternative embodiments place these in a single column and/or treat these together as one unit. While different types of port configurations and specific port configurations are illustrated, these are exemplary; thus a different set of port configurations may include less types (e.g., one or two), different specific configurations, and or different ordering of types/specific port configurations.

Figure 4:
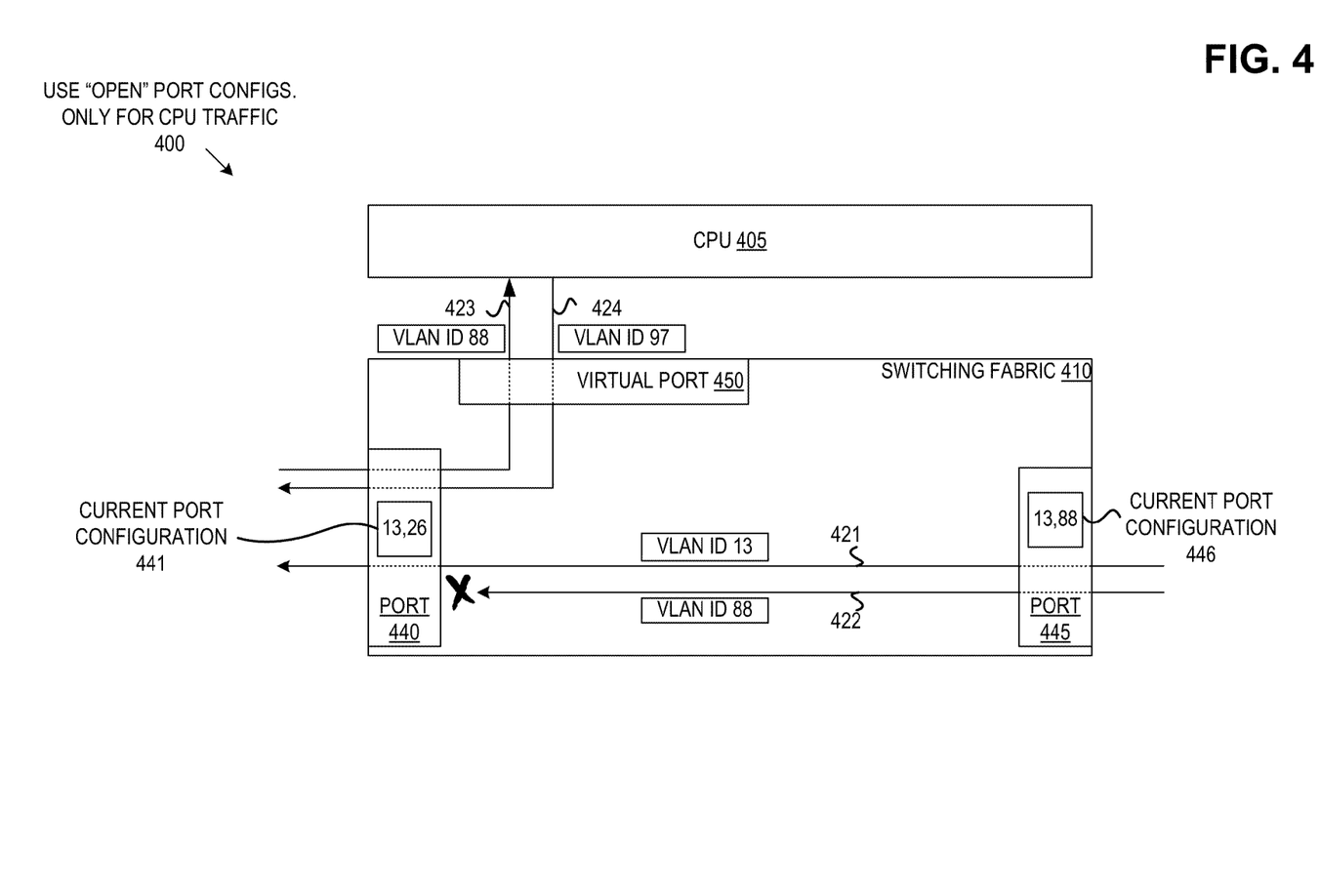
FIG. 4 is a diagram illustrating a switching fabric and CPU of the network switch configured to assign special status to all traffic destined to or originating from a CPU of the network switch to allow the use of relaxed port configurations only for CPU traffic, in accordance with exemplary embodiments of the invention.

FIG. 4 is a diagram illustrating a switching fabric and CPU of the network switch configured to assign special status to all traffic destined to or originating from a CPU of the network switch to allow the use of relaxed port configurations only for CPU traffic, in accordance with exemplary embodiments of the invention. In FIG. 4, a switching fabric 410 received traffic destined to or originating from (423, 424) a CPU 405. In the illustrated example 400, the relaxed set of port configurations that only the CPU is allowed to utilize are the "open" port configurations 213. By way of simplification, the parts of the switching fabric 410 to support only two of the ports of the network switch are shown—specifically, the switching fabric 410 is shown include a first port 440 and a second port 445. The switching fabric also includes a virtual port 450 allowing traffic to be sent to 423 and from 424 the CPU 405. The first port 440 and second port 445 each include a current port configuration 441 and 446, respectively, that indicates a set of VLAN IDs for that port. Thus, the first port 440, through its current port configuration 441 will communicate through traffic belonging to either VLAN ID 13 or 26, and the second port 424, through its current port configuration 446, will communicate through traffic belonging to either VLAN ID 13 or 88.

When a first packet 421 is received by the second port 446 having a VLAN ID of 13, it is communicated through by the first port 445 because VLAN ID 13 is an acceptable VLAN ID according to that port's current port configuration 446. Assuming that packet 421 is to be forwarded out the first port 440, the packet 421 will successfully be processed and forwarded because VLAN ID 13 is also a part of the first port's current port configuration 441. However, when a second packet 422 arrives on the second port 445 with a VLAN ID of 88, the second packet 422 will be blocked/dropped because the outbound first port 440 does not have VLAN ID 88 within its set of acceptable VLAN IDs in its current port configuration 441.

However, when the network switch is in a mode of port configuration relaxation and security measure utilization having "open" port configurations 213 only for CPU traffic 232, the CPU 405 may transmit a packet 424 having a VLAN ID of 97 using its virtual port 450 through the first port 440, even though the first port 440 does not include VLAN ID 97 within its current port configuration 441. Similarly, an inbound packet 423 with a VLAN ID of 88—typically not allowed by the current port configuration 441 of the first port 440 (see, e.g., packet 422 received on the second port 445)—will be processed by the first port 440 and switching fabric 410 because it is CPU traffic. In one embodiment, this special status is implemented using the virtual port 450 and the packet extraction and packet injection mechanism 222, described later herein. In other, non-depicted embodiments utilizing "open" port configurations 213 without the limitation that relaxed port configurations are applicable only to CPU traffic, any packet having any VLAN ID will be processed by the switching fabric 410 of the network switch.

Figure 5:
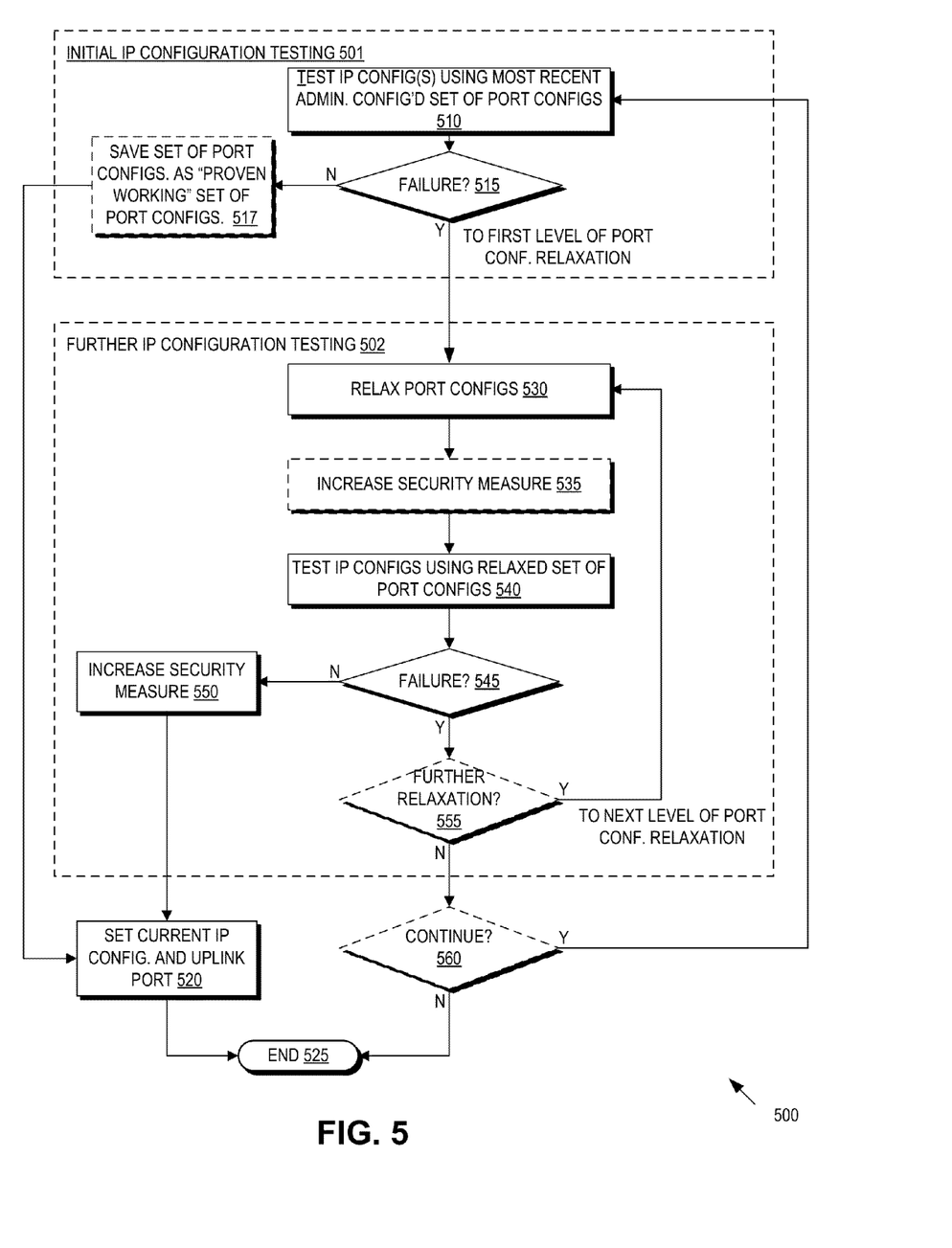
FIG. 5 is a flow diagram illustrating a process for a network switch to attempt to automatically establish a connection to a WAN, including determining which of a plurality of ports of a network switch is a current uplink port coupled to the WAN, in accordance with exemplary embodiments of the invention.

FIG. 5 is a flow diagram illustrating a process 500 of automatically establishing connectivity to a WAN, including determining which of a plurality of ports of a network switch is a current uplink port coupled to a wide area network, in accordance with an embodiment of the invention. FIG. 5 may begin response to power up or upon detecting a loss of connectivity to the WAN.

As illustrated, the process 500 depicts two general tasks or sub-processes—initial IP configuration testing 501 and further IP configuration testing 502. In initial IP configuration testing 501, the network switch first tests IP configuration(s) using as the current set of port configurations a most recent administratively configured set of port configurations 510 (with regard to FIG. 3, the current set of port configurations 312 identifies most recent administratively configured set or port configurations 302A). If, using these most recent administratively configured set of port configurations, the network switch does not have a failure 515 and thus is able to determine a valid IP configuration and uplink port, the switch may optionally save that set of port configurations as the most recent set of "proven working" port configurations 517 for possible later use. This may be accomplished in a variety of ways known to those of ordinary skill in the art, including but not limited to the use of pointers, flags, or dedicated storage locations. Then, this found IP configuration is set as the current IP configuration and the found uplink port is set as the current uplink port 520. At this point, the process ends 525 as connectivity to the WAN has been established, and thus a valid uplink port has been determined.

However, if the testing of IP configurations using the administratively configured set of port configurations 510 fails 515 to find a valid IP configuration and uplink port, the first level of port relaxation 120 occurs by performing further IP configuration testing 502 in a new mode of operation. In this depicted embodiment, a relaxation of the port configurations occurs 530 and security is optionally increased 535, depending upon the configuration. In embodiments of the invention, the first relaxation of the port configurations 530 is setting the current set of port configurations 312 to be the most recent proven working set of port configurations 302B, and no increased security measure 535 is utilized at this stage of the process 500. Now operating under the new mode, IP configurations are tested using the relaxed set of port configurations 540. If a working IP configuration and uplink port is found (and thus, no failure 545 occurs), a security measure is set 550 (alerting the management server 231). The determined working current IP configuration and uplink port are set 520 and the process terminates 525. Otherwise, if no deeper relaxation is to occur 555, the network switch may be configured to continue 560 by returning back to initial IP configuration testing 501 (the current set of port configurations is set back to the most recent administratively configured port configurations), or else terminating the process for some time or completely 525 (as previously described).

However, in embodiments of the invention that support a further level of relaxation, if this first level of port configuration relaxation results in a failure 545 to find a working IP configuration and uplink port, further relaxation occurs 555. If so, the process 500 proceeds to a next (i.e. second 130) level of port configuration relaxation and further IP configuration testing by further relaxing the port configurations 530 and optionally increasing the security measure 535. In embodiments of the invention, this second level 130 comprises relaxing the port configurations by using "open" port configurations 213 and the security measure is increased 535 by only allowing CPU traffic to use these relaxed port configurations 232. At this point, IP configurations are again tested 540. Upon success (not a failure 545), the security measure is increased 550 (e.g. alerting a management server), the determined working IP configuration and uplink port are set 520, and the process 500 ends. If a failure flow passes to block 555 if implemented, or to block 560.

Different embodiments may perform blocks 510/515 and 540/545 differently (e.g., in one embodiment, a timer is started when block 510 or 540 is begun, and if a valid IP configuration is not found prior to the timer reaching a threshold, then a failure is determined in block 515 and 545, respectively).

Although not shown, the network switch may optionally periodically test the current IP configuration and associated uplink port (using the current set of port configurations) to verify that they are still valid (i.e., that network switch 602 still has access to the WAN). The testing of the current IP configuration may performed in a similar manner as described above; for example, using the current IP configuration to transmit an ARP request on the current uplink port and responding appropriately to any reply; and/or using the current IP configuration to send a DNS to a known host and responding appropriately to a reply.

Figure 6:
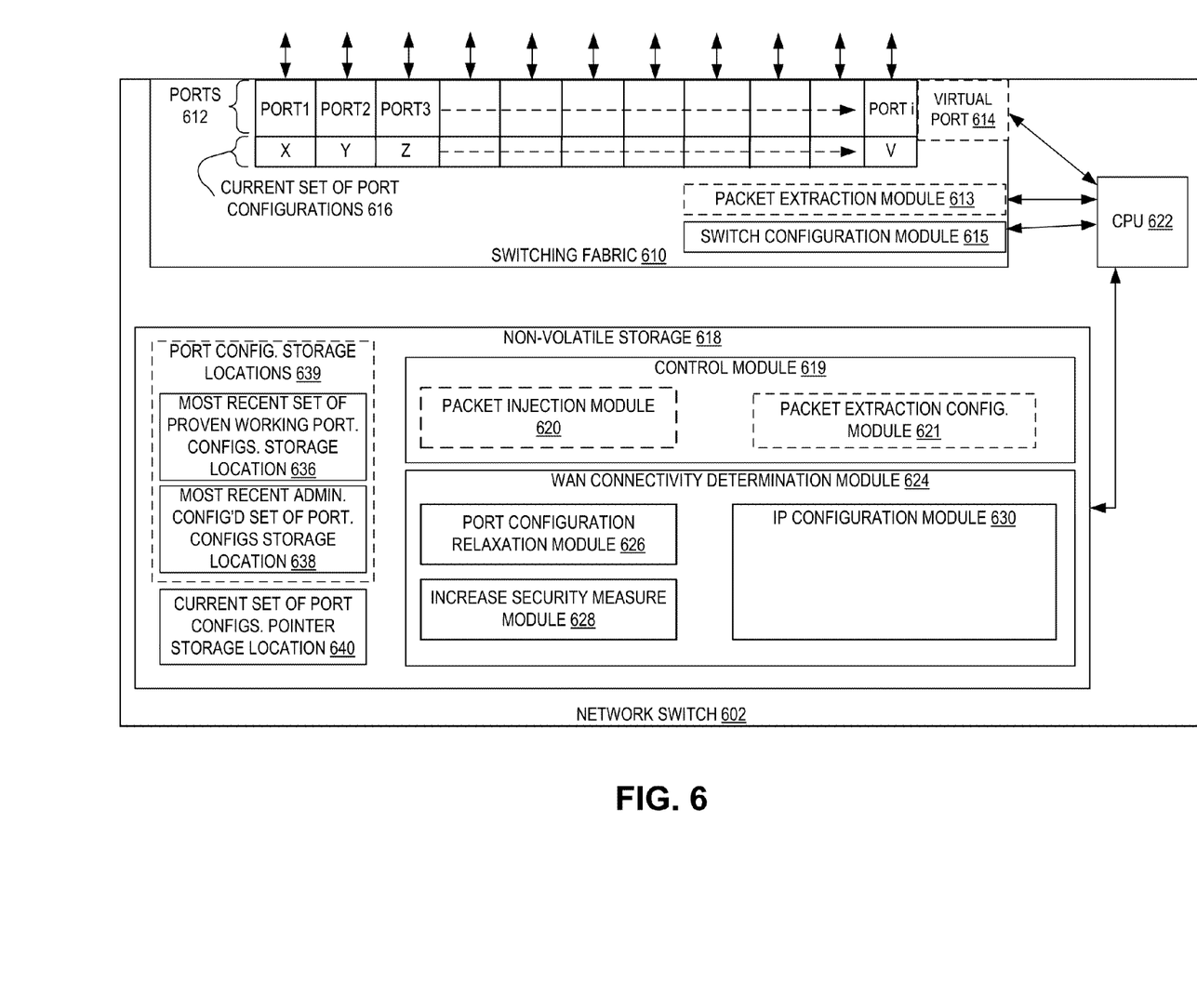
FIG. 6 is a block diagram illustrating a network switch capable of automatically establishing a connection to a WAN, including determining which of a plurality of ports of a network switch is a current uplink port coupled to the WAN, in accordance with exemplary embodiments of the invention.

FIG. 6 is a block diagram illustrating a network switch 602 capable of automatically establishing connectivity to a WAN, including determining which of a plurality of ports 612 of that network switch 602 is a current uplink port coupled to the wide area network, in accordance with an embodiment of the invention. The network switch 602 includes a switching fabric 610 along with a plurality of ports 612 operable to transmit and receive network traffic. Each of the plurality of ports 612 has a port configuration in the current set of port configurations 616, which configures that port. The network switch 602 may optionally include a virtual port 614 that allows the CPU 622 of the network switch 602 to transmit network traffic into and receive network traffic from the switching fabric 610 (and thereby, transmit out and receive packets from the other ports 612). To this end, the switching fabric 610 may include a packet extraction module 613, which provides a set of rules indicating which packets received by the network switch 602 are to be "extracted" and thereby sent to the CPU for analysis. The packet extraction module 613 may include a set of one or more packet extraction match tables (not illustrated) including packet header values or payload values that, when matched by respective values from a particular packet, indicate that an action (such as forwarding a copy of the packet to the CPU) is to occur. In embodiments of the invention, "extracted" means that a packet traveling through the network switch 602 is either: 1) only sent to the CPU 622 (or stored to allow the CPU 622 to analyze that packet) or 2) duplicated for the CPU 622 and the original packet traveling through the network switch 602, depending upon the embodiment, may continue to be processed and forwarded on to its eventual destination or alternatively dropped/removed from processing by the switching fabric 610.

The switching fabric 610, in the illustrated embodiment of FIG. 6, also includes a switch configuration module 615 allowing the network switch 602, through the CPU 622, to configure the ports 612 by applying a set of port configurations as the current set of port configurations 616.

In addition to the switching fabric 610 and CPU 622, the network switch 602 of FIG. 6 also includes a non-volatile storage 618 providing a control module 619, WAN connectivity determination module 624, port configuration storage locations 639, and a current set of port configurations pointer storage location 640. The port configuration storage locations 639 includes: 1) a most recent set of proven working port configurations storage location 636 that provides storage for the most recent set of proven working port configurations 211/302B; and 2) a most recent administratively configured set of port configurations storage location 638 that provides storage for the last of the port configurations entered or configured by an administrator or administrative process 302A. Current port configurations pointer storage location 640 provides storage for a pointer utilized to efficiently track which of the sets of port configurations stored in the port configuration storage locations 639 is the current set of port configurations (see illustrated pointer 312).

The control module 619, which in the illustrated embodiment, contains a packet injection module 620 and a packet extraction configuration module 621. The packet injection module 620 allows the network switch 602 to inject CPU-created packets into the switching fabric 610 to be sent out one or more ports 612 (irrespective of the current port configurations—e.g., by placing a special header on each packet which causes the switching fabric to not apply the current set of port configurations to, and thus pass the packet through regardless of the VLAN ID is contains). The packet extraction configuration module 621 allows the network device 602 to configure the packet extraction module 613 of the switching fabric 610, thereby enabling the network switch 602 to manage the logic and/or data structures (e.g. set of packet extraction match tables, described above) used in the packet extraction module 613 to control which packets traveling through the network switch 602 are to be "extracted" to the CPU for analysis.

The non-volatile storage 618 also includes a WAN connectivity determination module 624 including a port configuration relaxation module 626, an increase security measure module 628, and an IP configuration module 630. The IP configuration module 630 allows the network switch 602 to test IP configurations using the current set of port configurations 616. The port configuration relaxation module 626 and increase security measure module 628 are used to switch modes in order to perform the port configuration relaxation and security measure progressions discussed throughout this description. For the uplink port determination module 624 to switch modes, the port configuration relaxation module 626, in some embodiments, along with the CPU 622 and switch configuration module 615, changes the current set of port configurations 616 to implement the port configuration relaxation options 210 of FIG. 2. Similarly, the increase security measure module 628 is also used to switch modes by, in conjunction with one or more of the CPU 622, packet injection module 620, and switch configuration module 615, implementing the security measures 230 of FIG. 2. For example, after a failure from the IP configuration module 630 testing IP configurations using a first set of port configurations 110 (such as an administratively configured set of port configurations 302A), the WAN connectivity determination module 624 changes modes through the port configuration relaxation module 626 changing the current set of port configurations 616 to a most recent proven working set of port configurations 211 and the increase security measure module 628 configuring the network switch 602 to alert the management server 231 of the change in port configurations. In another example, after a failure from the IP configuration module 630 testing IP configurations using a first set of port configurations 110 (such as an administratively configured set of port configurations 302A), the WAN connectivity determination module 624 changes modes through the port configuration relaxation module 626 changing the current set of port configurations 616 to utilize "open" port configurations 213 and the increase security measure module 628 configuring the network switch 602 to both alert the management server 231 of the change in port configurations and only use the relaxed "open" port configurations for CPU traffic 232.

Figure 7:
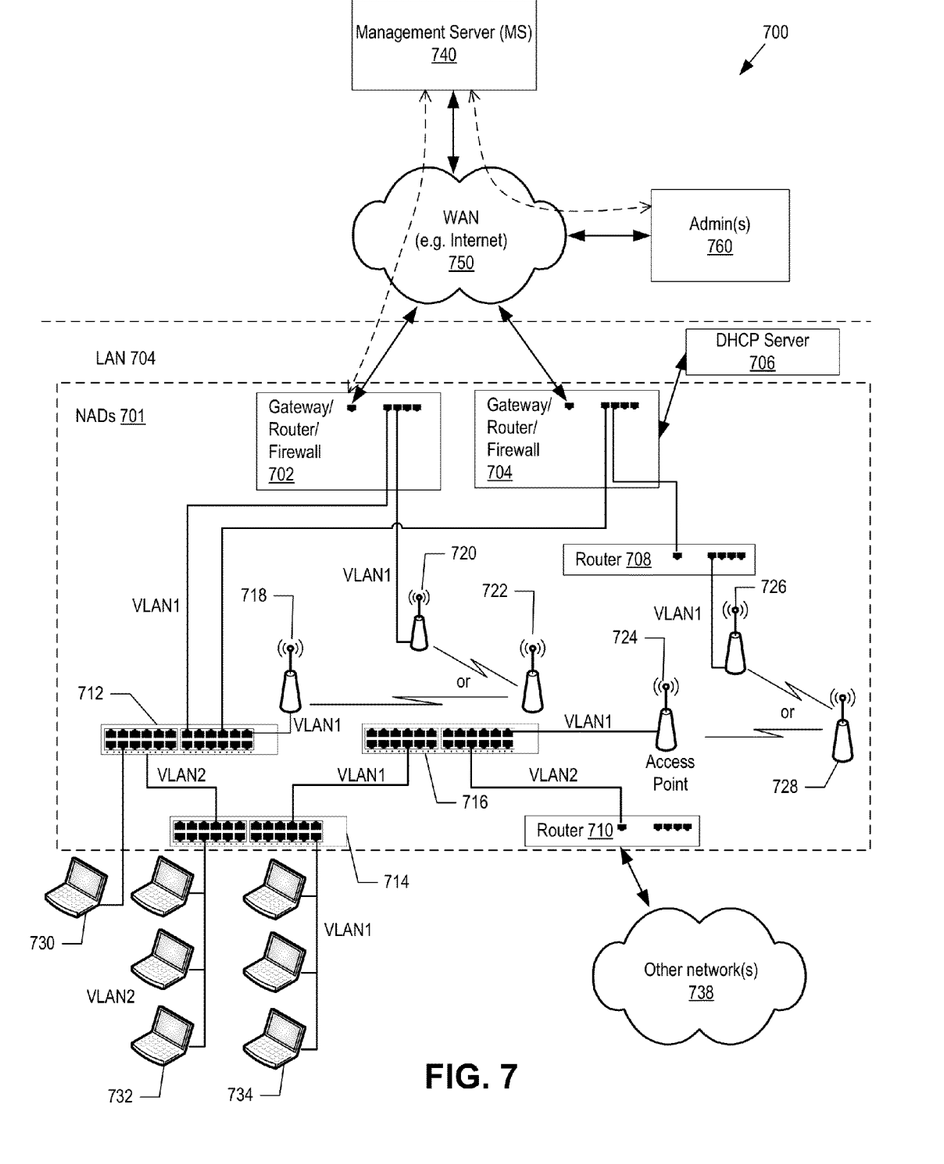
FIG. 7 is a block diagram illustrating a network configuration 700 including several network access devices (NADs) 701, in accordance with an embodiment of the invention.

As previously described, the network switch may be a network administered deceives, to be administered via a management server over a WAN. FIG. 7 is a block diagram illustrating a network configuration 700 including several network access devices (NADs) 701, in accordance with an embodiment of the invention. FIG. 7 shows a manager server 740 coupled through a WAN 750 to a LAN 704. The LAN includes NADs 701 used to provide network access to computing devices/end stations (730, 732 on VLAN2, and 734 on VLAN1). The management server 740 provides for "cloud-based" management of appropriately enabled network access devices, including network switches 712-716. Specifically, a communication channel (e.g., a secure IP tunnel) is established between appropriately enabled network access devices 701 and the Management Server 740, which allows for information to be sent between them (e.g., configurations sent from the Management Server 740 to a given network switch, and/or information to be sent from that given network switch to the Management Server 740). A set of one or more administrators 712 may use electronic devices (either outside or inside the LAN 704) to communicate over the WAN with the Management Server 740, and thus administer the appropriately enabled network access devices, including network switches 712-716 (which are all intermediate nodes in the LAN).

In one embodiment of the invention, the management server 740 is multi-tenant, meaning that multiple organizations with different network administrators may have network access devices managed by the same management server 740. Therefore, management server 740 may be provided to allow Administrators to manage their respective network access devices even though the network access devices belong to separate and distinct entities.

The illustrated interconnectivity of NADs 701 represents one possible implementation of a LAN 704, where one or more of network switches (e.g., 712-714) are in accordance with embodiments of the present invention. FIG. 7 illustrates the complexity and variety of possible interconnectivity and device types that may need to be accounted for by a system administrator (e.g., admin 712) when configuring a network switch within a LAN 704. For example, LAN 704 includes multiple gateways to WAN 710, multiple VLANs, and multiple possible paths to WAN 710 by many of the NADs 701. A change in one of the NADs 701 may require complex configuration changes to one or more of the downstream NADs, including one or more of the network switches (e.g., 712-714). For example, a configuration change or fault in router 702 may result in required configuration changes to wireless access points 720 and network switch 712.

As is apparent, manual configuration of the network switches in a network such as LAN 704 can be complex and relatively error prone. Furthermore, changes to LAN 704 resulting is a loss of network connectivity may be difficult to diagnose and troubleshoot. Accordingly, embodiments of the present disclose allow for an installer to install one or more of network switches 712-716 by simply powering on the device and connecting a cable. Then, the network switch may automatically establish a connection to WAN 710, such that Administrator 712 may remotely configure that network switch by way of management server 714.

Embodiments of the present disclosure may also allow a system administrator to intentionally misconfigure a network switch prior to deployment. For example, an administrator could deploy a network switch in a first network geographically collocated with the administrator (e.g., a staging network, a testing network) for the purpose of configuring the network switch for redeployment in a second network (e.g., one that is not geographically close to the administrator). Assuming that the network switch has a current (first) set of port configurations with which the network switch can establish connectivity to the WAN, then this set of port configurations would be stored as the most recent set of proven working port configurations. The administrator (or administrative process performed by another device) could then (e.g., over the WAN) cause the entry of a different (second) set of port configurations into the network switch (which would be stored as the most recent administratively configured set of port configurations) to be used when the network switch is redeployed in the second network; the network switch would start using this second set of port configurations and possibly lose connectivity to the WAN as a result. Assuming connectivity to the WAN was lost, the network switch would automatically relax to the most recent set of proven working port configurations (i.e., the first set of port configurations); and connectivity to the WAN would be restored (but the network switch would still have the second set of port configurations stored as the most recent administratively configured set of port configurations). Assuming a user interface that allowed for viewing of the most recent administratively configured set of port configurations over the WAN, the administrator could check over the second set of port configurations. Then the administrator could redeploy the network switch to the second network; and upon being restarted in this second network, the network switch would attempt to establish connectivity to the WAN using as the current set of port configurations the most recent administratively configured set of port configurations (not the most recent set of proven working port configurations). Assuming the network switch was properly configured, WAN connectivity would be established under this set of port configurations (at which point, the current set of port configurations (that is, the most recent administratively configured set of port configurations) would also be stored as the most recent set of proven working port configurations). In this way, an administrator could configure a network switch over the WAN in the first network for redeployment in a second network. However, even if it was not configured properly, certain embodiments of the network switch that support a further level of port configuration relaxation, can then relax the set of port configurations again and likely eventually establish connectivity to the WAN (a valid IP configuration and uplink port).

The order in which some or all of the process blocks appear in each process should not be deemed limiting. Rather, one of ordinary skill in the art having the benefit of the present disclosure will understand that some of the process blocks may be executed in a variety of orders not illustrated.

One or more parts of an embodiment of the invention may be implemented using different combinations of software, firmware, and/or hardware. Those part implemented in software/firmware are stored in a machine (e.g., computer) readable medium. That is, an electronic device (e.g., a NAD) stores and transmits (internally and/or with other electronic devices over a network) code (composed of software instructions) and data using machine-readable media, such as non-transitory tangible machine-readable media (e.g., machine-readable storage media such as magnetic disks; optical disks; read only memory; flash memory devices; phase-change memory) and transitory machine-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data). Thus, a non-transitory machine-readable medium of a given electronic device typically stores instructions for execution on one or more processors of that electronic device.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method comprising:
by a network switch within a local area network (LAN), attempting to establish connectivity to a wide area network (WAN) over a plurality of ports with a first set of Internet Protocol (IP) configurations using a first set of port configurations as a current set of port configurations, wherein an IP configuration of the first set of IP configurations includes a Virtual Local Area Network (VLAN) identifier (ID), an IP address for the network switch, a subnet mask, an IP address of a gateway, and an IP address of a Domain Name System (DNS) server, wherein the network switch is coupled to a network access device that is within the LAN and that acts as the gateway to the WAN, wherein the network switch includes the plurality of ports any one of which may be coupled to the network access device and operate as a current uplink port for establishing connectivity to the WAN, wherein the network switch has the current set of port configurations that includes a respective current port configuration for each of the plurality of ports, wherein the respective current port configuration for the each of the plurality of ports identifies a set of VLAN IDs, wherein network traffic must meet a current port configuration for a specific port of the plurality of ports on which the network traffic is received or transmitted to avoid the network traffic from being blocked at the specific port;
responsive to determining that connectivity to the WAN has not been established, automatically performing:
switching to a first mode that has a first security measure and that relaxes the current set of port configurations from the first set of port configurations to a second set of port configurations, and after switching to the first mode, attempting to establish connectivity to the WAN with a second set of IP configurations using the current set of port configurations; and responsive to determining that attempting to establish connectivity to the WAN with the second set of IP configurations did not result in connectivity to the WAN being established, automatically performing:

switching to a second mode that has a second security measure and that relaxes the current set of port configurations from the second set of port configurations to a third set of port configurations, wherein the second security measure is equally secure or more secure than the first security measure, and after switching to the second mode, attempting to establish connectivity to the WAN with a third set of IP configurations using the current set of port configurations.

2. The method of claim 1, further comprising:
responsive to determining that said attempting to establish connectivity to the WAN with the second set of IP configurations did result in connectivity to the WAN being established using a first port of the plurality of ports, automatically setting the current uplink port to be the first port.

3. The method of claim 2, wherein the first security measure comprises:
transmitting, to a management server coupled to the WAN that provides remote management of the network switch over the WAN, data indicating that the current set of port configurations is not the first set of port configurations.

4. The method of claim 1, wherein:
the first set of port configurations are an administratively configured set of port configurations; and
the second set of port configurations are a proven working set of port configurations.

5. The method of claim 4, wherein the first security measure is one or more of:
transmitting, to a management server coupled to the WAN that provides remote management of the network switch over the WAN, data indicating that the current set of port configurations is not the first set of port configurations; and
communicating through the plurality of ports only traffic originating from or destined to a CPU of the network switch using a third set of port configurations.

6. The method of claim 1, wherein:
the second set of port configurations are open port configurations indicating that traffic is allowed to use any VLAN ID; and
the first security measure is transmitting, at the plurality of ports, only traffic originating from or destined to a CPU of the network switch using said open port configurations.

7. The method of claim 1, wherein the first set of port configurations is a most recent administratively configured set of port configurations, wherein the second set of port configurations is a most recent set of proven working port configurations, and wherein the network switch stores both the most recent administratively configured set of port configurations and the most recent set of proven working port configurations, and wherein the most recent set of proven working port configurations is set to be the same as the most recent administratively configured set of port configurations when the most recent administratively configured set of port configurations is used to establish connectivity to the WAN.

8. A system comprising:
a network switch that automatically establishes a connection to a wide area network (WAN), wherein the network switch is to be coupled to a network access device that is within a local area network (LAN) and that acts as a gateway to the WAN, wherein the network switch includes a plurality of ports any one of which may be coupled to the network access device and operate as a current uplink port for establishing the connection to the WAN;

a current set of port configurations that includes a respective current port configuration for each of the plurality of ports, wherein the respective current port configuration for the each of the plurality of ports is to identify a set of Virtual Local Area Network (VLAN) identifiers (IDs), wherein network traffic must meet a current port configuration for a specific port, of the plurality of ports, on which the network traffic is received or transmitted to avoid the network traffic from being blocked at the specific port; and a WAN connectivity determination module coupled to the plurality of ports and configured to:
attempt to establish connectivity to the WAN over the plurality of ports with a first set of Internet Protocol (IP) configurations using a first set of port configurations as the current set of port configurations, wherein an IP configuration includes a VLAN ID, an IP address for the network switch, a subnet mask, an IP address of the gateway, and an IP address of a Domain Name System (DNS) server, and responsive to the network switch determining that connectivity to the WAN has not been established, automatically perform:
switching to a first mode that has a first security measure and that relaxes the current set of port configurations from the first set of port configurations to a second set of port configurations, and
after switching to the first mode, attempting to establish connectivity to the WAN with a second set of IP configurations using the current set of port configurations, and responsive to the network switch determining that attempting to establish connectivity to the WAN with the second set of IP configurations did not result in connectivity to the WAN being established, automatically perform:
switching to a second mode that has a second security measure and that relaxes the current set of port configurations from the second set of port configurations to a third set of port configurations, wherein the second security measure is equally secure or more secure than the first security measure, and
after switching to the second mode, attempting to establish connectivity to the WAN with a third set of IP configurations using the current set of port configurations.

9. The system of claim 8, wherein the WAN connectivity module is further configured to:
responsive to determining that said attempt to establish connectivity to the WAN with the second set of IP configurations did result in connectivity to the WAN being established using a first port of the plurality of ports, automatically set the current uplink port to be the first port.

10. The system of claim 9, wherein the first security measure comprises transmitting, to a management server coupled to the WAN that provides remote management of the network switch over the WAN, data indicating that the current set of port configurations is not the first set of port configurations.

11. The system of claim 8, wherein:
the first set of port configurations are an administratively configured set of port configurations; and
the second set of port configurations are a proven working set of port configurations.

12. The system of claim 11, wherein the first security measure is one or more of:
transmitting, to a management server coupled to the WAN that provides remote management of the network switch over the WAN, data indicating that the current set of port configurations is not the first set of port configurations; and
communicating through the plurality of ports only traffic originating from or destined to the network switch using a third set of port configurations.

13. The system of claim 8, wherein:
the second set of port configurations are open port configurations indicating that traffic is allowed to use any VLAN ID; and
the first security measure is configuring the network switch to transmit, at the plurality of ports, only traffic originating from or destined to the network switch using said open port configurations.

14. The system of claim 8, wherein the first set of port configurations is a most recent administratively configured set of port configurations, wherein the second set of port configurations is a most recent set of proven working port configurations, and wherein the network switch stores both the most recent administratively configured set of port configurations and the most recent set of proven working port configurations, and wherein the most recent set of proven working port configurations is set to be the same as the most recent administratively configured set of port configurations when the most recent administratively configured set of port configurations is used to establish connectivity to the WAN.

15. A non-transitory computer readable medium containing instructions that, when executed by a network switch, cause the network switch to perform a method comprising:
attempting to establish connectivity to a wide area network (WAN) over a plurality of ports with a first set of Internet Protocol (IP) configurations using a first set of port configurations as a current set of port configurations, wherein an IP configuration of the first set of IP configurations includes a Virtual Local Area Network (VLAN) identifier (ID), an IP address for the network switch, a subnet mask, an IP address of a gateway, and an IP address of a Domain Name System (DNS) server, wherein the network switch is coupled to a network access device that is within a local area network (LAN) and that acts as the gateway to the WAN, wherein the network switch includes the plurality of ports any one of which may be coupled to the network access device and operate as a current uplink port for establishing connectivity to the WAN, wherein the network switch has the current set of port configurations that includes a respective current port configuration for each of the plurality of ports, wherein the respective current port configuration for the each of the plurality of ports identifies a set of VLAN IDs, wherein network traffic must meet a current port configuration for a specific port of the plurality of ports on which the network traffic is received or transmitted to avoid the network traffic from being blocked at the specific port;
responsive to determining that connectivity to the WAN has not been established, automatically performing:
switching to a first mode that has a first security measure and that relaxes the current set of port configurations from the first set of port configurations to a second set of port configurations, and
after switching to the first mode, attempting to establish connectivity to the WAN with a second set of IP configurations using the current set of port configurations; and
responsive to determining that attempting to establish connectivity to the WAN with the second set of IP configurations did not result in connectivity to the WAN being established, automatically performing:
switching to a second mode that has a second security measure and that relaxes the current set of port configurations from the second set of port configurations to a third set of port configurations, wherein the second security measure is equally secure or more secure than the first security measure, and
after switching to the second mode, attempting to establish connectivity to the WAN with a third set of IP configurations using the current set of port configurations.

16. The non-transitory computer readable medium of claim 15, wherein the method further comprises:
responsive to determining that said attempting to establish connectivity to the WAN with the second set of IP configurations did result in connectivity to the WAN being established using a first port of the plurality of ports, automatically setting the current uplink port to be the first port.

17. The non-transitory computer readable medium of claim 16, wherein the first security measure comprises transmitting, to a management server coupled to the WAN that provides remote management of the network switch over the WAN, data indicating that the current set of port configurations is not the first set of port configurations.

18. The non-transitory computer readable medium of claim 15, wherein:
the first set of port configurations are an administratively configured set of port configurations; and
the second set of port configurations are a proven working set of port configurations.

19. The non-transitory computer readable medium of claim 18, wherein the first security measure is one or more of:
transmitting, to a management server coupled to the WAN that provides remote management of the network switch over the WAN, data indicating that the current set of port configurations is not the first set of port configurations; and
communicating through the plurality of ports only traffic originating from or destined to the network switch using a third set of port configurations.

20. The non-transitory computer readable medium of claim 15, wherein:
the second set of port configurations are open port configurations indicating that traffic is allowed to use any VLAN ID; and
the first security measure is transmitting, at the plurality of ports, only traffic originating from or destined to the network switch using said open port configurations.

21. The non-transitory computer readable medium of claim 15, wherein the first set of port configurations is a most recent administratively configured set of port configurations, wherein the second set of port configurations is a most recent set of proven working port configurations, and wherein the network switch stores both the most recent administratively configured set of port configurations and the most recent set of proven working port configurations, and wherein the most recent set of proven working port configurations is set to be the same as the most recent administratively configured set of port configurations if and when the most recent administratively configured set of port configurations is used to establish connectivity to the WAN.

* * * * *